Figure 1:
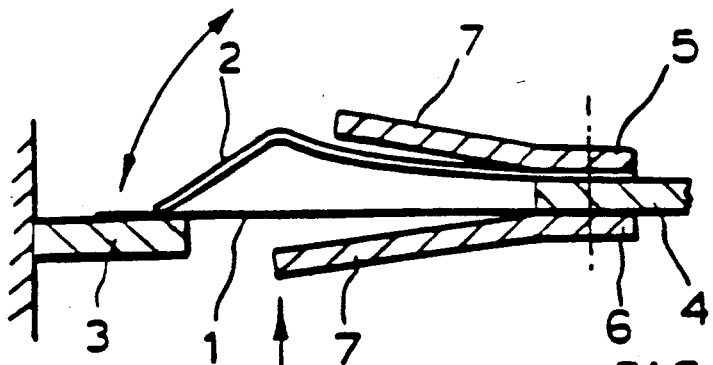

United States Patent [19]

Squirrell

[11] Patent Number: 5,099,886
[45] Date of Patent: Mar. 31, 1992

[54] SEALS FOR GAS ISOLATORS HAVING MULTIPLE BIAS SPRINGS

[75] Inventor: Anton F. Squirrell, Mellingen, Switzerland

[73] Assignee: Grovag Grossventiltechnik AG, Baar, Switzerland

[21] Appl. No.: 474,023

[22] PCT Filed: Aug. 22, 1989

[86] PCT No.: PCT/GB89/00975

§ 371 Date: Jun. 22, 1990

§ 102(e) Date: Jun. 22, 1990

[87] PCT Pub. No.: WO90/02279

PCT Pub. Date: Mar. 8, 1990

[30] Foreign Application Priority Data

Aug. 31, 1988 [GB] United Kingdom ............ 8820524

[51] Int. Cl.⁵ ............................................ F16K 11/14
[52] U.S. Cl. .................... 137/856; 137/527; 137/857; 251/174; 251/176; 277/236
[58] Field of Search ............ 277/12, 236; 137/601, 137/857, 527, 856; 251/174, 176, 177, 902; 267/48, 158, 164

[56] References Cited

U.S. PATENT DOCUMENTS

| 735,912 | 8/1903 | Schrotz | 137/527 X |
|---|---|---|---|
| 2,000,883 | 5/1935 | Cullen et al. | 137/857 X |
| 2,196,798 | 4/1940 | Horstmann | 251/334 |
| 3,620,242 | 11/1971 | Pease . | |
| 3,698,429 | 10/1972 | Lowe et al. | 137/601 |
| 3,794,311 | 2/1974 | Rode | 267/158 |
| 4,208,044 | 6/1980 | Schoenfeld | 267/48 |
| 4,325,411 | 4/1982 | Squirrell | 137/601 X |
| 4,334,550 | 6/1982 | Connor et al. | 137/242 |
| 4,575,099 | 3/1986 | Nash | 277/12 |
| 4,628,963 | 12/1986 | Ishijima et al. | 137/857 |
| 4,664,154 | 5/1987 | Kamata et al. | 137/857 |
| 4,823,836 | 4/1989 | Bachmann et al. | 251/177 X |

Primary Examiner—William A. Cuchlinski, Jr.
Assistant Examiner—Scott W. Cummings
Attorney, Agent, or Firm—Gottlieb, Rackman & Reisman

[57] ABSTRACT

A cantilever leaf spring (1) attached to a fixed frame or movable member of a gas isolator is acted on by a bias spring (2) and an additional similar, but not identical, bias spring (12).

5 Claims, 1 Drawing Sheet

SEALS FOR GAS ISOLATORS HAVING MULTIPLE BIAS SPRINGS

This invention relates to seals for gas isolators, and in particular relates to an improvement in or modification of the type of seal described in British patent no. GB-2060824 and its equivalent U.S. Pat. No. 4,325,411.

GB-2060824 (U.S. Pat. No. 4,325,411) describes and claims a seal for a gas isolator which comprises a cantilever leaf spring to be attached to a fixed frame or a movable member of the isolator and a bias spring acting on the leaf spring, wherein the leaf spring is bent or curved when unstressed and wherein in the non-sealing position of the seal the bias spring makes only touch contact with the leaf spring, so that the leaf spring is unstressed in the said non-sealing position, whereby in the sealing position of the seal the stress induced in the bias spring will be the same as that induced in the leaf spring where the bias spring and the leaf spring have the same section modulus per unit length of seal.

We have now found that, on seals operating against the gas pressure, the addition of a second similar, but not identical, bias spring permits the reverse pressure sealing performance to be greatly improved.

Accordingly, the present invention provides a seal for a gas isolator which comprises a cantilever leaf spring to be attached to a fixed frame or a movable member of an isolator and a bias spring acting on the leaf spring, and further comprising a second similar, but not identical, bias spring acting on the first bias spring and therethrough on the said leaf spring.

Usually the leaf spring and the two bias springs will be clamped at the same point, and the tips (or free ends) of the bias springs will be so arranged that they act on the leaf spring essentially jointly at the point where the first bias spring bears against the leaf spring.

The bias springs will be, as is conventional, bent at a point along their length, one limb of the dual bias spring combination being clamped and the other limb of the bias spring combination bearing with its free end against the leaf spring. In the construction according to the invention the angle subtended by the two limbs of the additional bias spring will preferably be less than the angle subtended by the two limbs of the original bias spring, while the length of the said other limb of the additional bias spring (i.e. the limb that bears against the end region of the original bias spring that bears against the leaf spring) will preferably be less than the length of the corresponding limb of the original bias spring, the overall length of the two bias springs being substantially the same.

Figure 2:
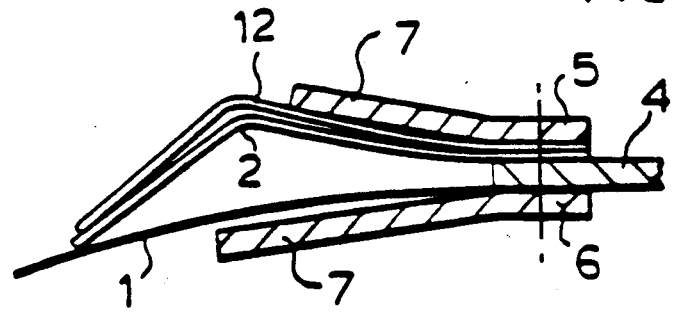
Figure 3A:
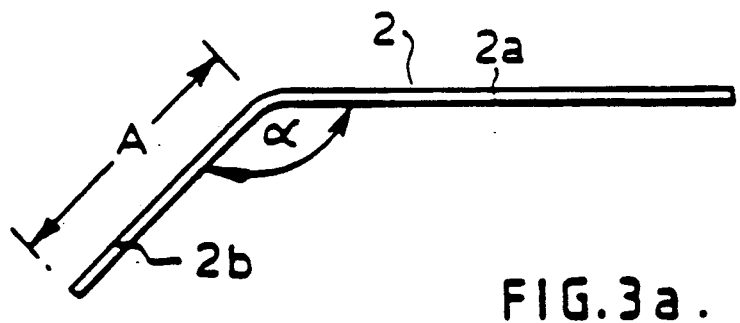
Figure 3B:
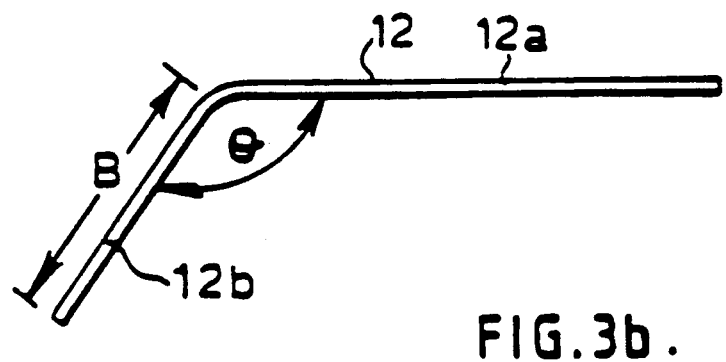

The invention will be further described by way of example only, with reference to the accompanying drawings, in which:

FIG. 1 shows a known gas isolator seal of the type described in GB-2060824 and U.S. Pat. No. 4,325,411;

FIG. 2 shows a preferred embodiment of a gas isolator seal according to the present invention; and FIGS. 3a and 3b show in detail the original bias spring and the additional bias spring respectively of the seal according to FIG. 2.

The conventional seal illustrated in FIG. 1 is shown in its sealing position and essentially comprises a cantilever leaf spring 1 and a bias spring 2. The leaf spring is arranged to press against a cooperating member 3 which will be a fixed frame or a movable closure member of an isolator when the seal is in the sealing position as shown. The bias spring and the leaf spring are clamped against a support 4 which will be a movable closure member or a fixed frame of an isolator by clamp bars 5 and 6 respectively which in this case are each integral with respective support bars 7.

In this conventional seal a differential pressure effective in the direction of the arrow as shown in FIG. 1 tends to lift the seal off its seating 3, sometimes leading to undesired leakage of high pressure and possibly also corrosive gases.

The seal according to the invention illustrated in FIG. 2 differs from that illustrated in FIG. 1 by the provision of an additional bias spring 12, which is similar but not identical to the bias spring 2. In FIG. 2 the seal is shown in its non-sealing position.

The provision of the additional bias spring 12 permits a considerable improvement in the reverse pressure sealing performance, in the seal according to the invention. More than twice the sealing force may be obtained with the seal according to the invention, and the leak rate may be halved.

As shown in FIGS. 3a and 3b each of the bias springs 2 and 12 essentially comprises a first limb 2a and 12a which is clamped by the bar 5 and a second limb 2b and 12b which jointly, i.e., one through the other, act on the cantilever leaf spring. The angle $\theta$ subtended by the limbs 12a and 12b of the additional bias spring 12 is preferably less than the angle $\alpha$ subtended by the limbs 2a and 2b of the bias spring 2, and the limb A of the bias spring 2 is preferably longer than the limb B of the additional bias spring 12, the overall length of the two bias springs being substantially the same.

While the seal according to the invention has been described above in particular in relation to the known seal according to GB-2060824, the invention is equally applicable to the type of seal described and claimed in GB-1308801.

I claim:

1. A seal for a gas isolator which includes a cantilever leaf spring (1) to be attached to a fixed frame or a movable member of an isolator, and a first bias spring (2) having a first limb (2a) which is clamped and a second limb (2b) which is oriented at an obtuse angle $\alpha$ to said first limb and terminates in a free end acting on said leaf spring (1); wherein the improvement comprises a second bias spring (12) similar, but not identical, in configuration to said first bias spring (2) and having a first limb (12a) which is clamped and a second limb (12b) which is oriented at a different obtuse angle ($\theta$) to said first limb of said second bias spring (12) and terminates in a free end acting on said second limb (2b) of said first bias spring (2) so that said free ends of said bias springs effectively act on said leaf spring (1) at substantially the same point.

2. A seal as claimed in claim 1, including clamping means (5, 6) which are operable to clamp said leaf spring (1) and said first limbs (2a, 12a) of said first and second bias springs (2, 12) to said fixed frame or movable member at substantially the same point.

3. A seal as claimed in claim 1, in which said angle ($\theta$) between said first and second limbs (12a, 12b) of said second bias spring (12) is less than said angle ($\alpha$) between said first and second limbs (2a, 2b) of said first bias spring (2).

4. A seal as claimed in claim 1, in which the length (B) of said second limb (12b) of said second bias spring (12) is less than the length (A) of said second limb (2b) of said first bias spring (2), the overall lengths of the two bias springs (2, 12) being substantially the same.

5. A gas isolator including a seal and a fixed frame or a movable member to which the seal is attached, said seal including a cantilever leaf spring (1) attached to said fixed frame or movable member, and a first bias spring (2) having a first limb (2a) which is clamped and a second limb (2b) which is oriented at an obtuse angle ($\alpha$) to said first limb and terminates in a free end acting on said leaf spring (1); wherein the improvement comprises a second bias spring (12) similar, but not identical, in configuration to said first bias spring (2) and having a first limb (12a) which is clamped and a second limb (12b) which is oriented at a different obtuse angle ($\theta$) to said first limb of said second bias spring (12) and terminates in a free end acting on said second limb (2b) of said first bias spring (2) so that said free ends of said first and second bias springs effectively act on said leaf spring (1) at substantially the same point.

* * * * *